United States Patent [19]

Runge et al.

[11] 3,854,048
[45] Dec. 10, 1974

[54] APPARATUS FOR DETERMINING NEUTRON FLOW DENSITY OVER A LARGE AREA IN A NUCLEAR REACTOR

[75] Inventors: Ernst-Georg Runge; Erich Klar, both of Erlangen, Germany

[73] Assignee: Siemens Aktiengesellschaft, Munich, Germany

[22] Filed: Mar. 1, 1973

[21] Appl. No.: 337,175

[30] Foreign Application Priority Data
Mar. 10, 1972  Germany.............................. 2211757

[52] U.S. Cl. .............................................. 250/390
[51] Int. Cl. ............................................. G01t 3/00
[58] Field of Search ........... 250/390, 392, 432, 370; 176/19 R

[56] References Cited
UNITED STATES PATENTS
3,234,385  2/1966  Campbell............................ 250/390
3,390,270  6/1968  Treinen et al. ...................... 250/390
3,711,714  1/1973  Klair et al. .......................... 250/390

Primary Examiner—James W. Lawrence
Assistant Examiner—Davis L. Willis
Attorney, Agent, or Firm—Kenyon & Kenyon Reilly Carr & Chapin

[57] ABSTRACT

Neutron flow density distribution is determined in a nuclear reactor by a device which includes two electrodes for measuring the current flowing between such electrodes. This current, based on beta radiation, is proportional to the neutron flow density. One of such electrodes is of an elongated configuration, while the other of such electrodes is divided into a plurality of sections distributed along the length of such elongated electrodes.

3 Claims, 3 Drawing Figures

APPARATUS FOR DETERMINING NEUTRON FLOW DENSITY OVER A LARGE AREA IN A NUCLEAR REACTOR

BACKGROUND OF THE INVENTION

1. Field of the Invention

The present invention relates to the measurement of neutron flow density in a nuclear reactor, and more particularly to the determination over a large area of the neutron flow density and its local distributions.

2. Description of the Prior Art

In order to determine the neutron flow density in a nuclear reactor, there are presently known measuring devices having two electrodes for measuring the current flowing between the electrodes, this current being dependent on beta radiation. In order to determine the neutron flow density distribution over large areas with such measuring devices, it is necessary to provide several of these electrode devices. This requires a complex and costly system for housing and connecting the several electrode devices, with special conduits leading through the wall of the pressurized reactor tank. These conduits, because of the high pressures and temperatures occurring in the reactor are very costly.

SUMMARY OF THE INVENTION

It is an object of the present invention to provide an apparatus for measuring neutron flow density distribution in a nuclear reactor, in a simple and efficient manner.

This, and other objects are achieved by the present invention which provides an apparatus for measuring the neutron flow density distribution in a nuclear reactor, including two electrodes for measuring the current flowing therebetween. One of these electrodes is elongated, while the other electrode is constituted by a plurality of separate electrode sections which are distributed along the length of the elongated electrode. Each of the electrode sections has associated with it a current measuring device for measuring the partial currents between the elongated electrode and sections.

The invention makes it possible to determine exactly over a large area the neutron flow density and its local distributions, whereby these measurements in each case are made between the elongated electrode and various sections of the divided electrode. For these measurements it is, for example, possible to use a common current measuring device that can be switched to all the sections, so that not only does the cost of making the electrodes remain small, but the cost remains small also for the current measuring device that indicates the current corresponding to the neutron flow density.

According to one embodiment, the device for measuring the partial currents is disposed outside a reactor pressurized tank containing the electrodes, and connected with the electrodes by a multistranded and preferably ceramically insulated cable. There is thus obtained, in comparison with the known probes having two electrodes and a single measuring possibility, which in order to determine the neutron flow density distribution have to be used in a multiplicity of probes that needs to be housed and connected a considerable simplification in the passage of the electric conductors through the wall of the pressurized reactor tank. This is important because such conduits or passageways, because of the high pressures and temperatures occurring in the reactor, are very costly.

According to another embodiment of the invention, the elongated electrode is disposed movably inside a guide-tube that extends out of the reactor pressurized tank. As a result, the electrode sections associated with the elongated electrode can be disposed outside the pressurized tank, at the location of the guide-tube and elongated electrode. In this case, it is no longer necessary to conduct any electric lines through the wall of the pressurized tank. With a suitable design of the movable electrode, and of the guide-tube extending out of the tank, the radiation load can be maintained small.

The elongated electrode is preferably made flexible, and is in particular made as a coil spring, with rounding-off of its end faces. It may be made of a metal, preferably vanadium, that can be activated.

DESCRIPTION OF THE PREFERRED EMBODIMENTS

Figure 1:
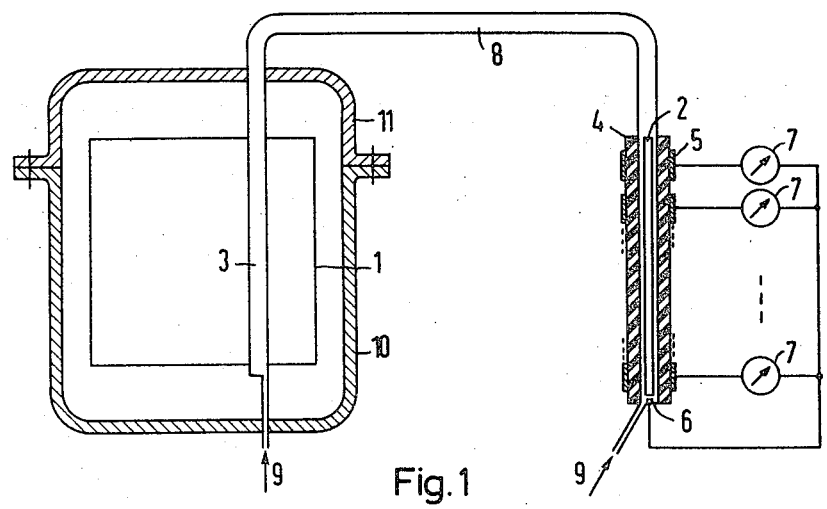
FIG. 1 is a schematic showing one embodiment of the apparatus of the present invention, wherein the elongated electrode is movable within a guide-tube extending outside of the reactor tank.

Referring to FIG. 1, there is shown in simplified manner one form of construction of the apparatus employing an elongated movable electrode. It serves to measure the neutron flow density in a core 1 of a pressurized-water power reactor. The nuclear reactor includes a reactor pressure tank 10 and a reactor cover 11 enclosing the reactor core 1. The apparatus includes a U-shaped guide-tube 8, which extends through the wall of the reactor pressure tank 10, and specifically through the cover 11 and into the core 1 at point 3. Guide-tube 8 determines the path for the length of the elongated movable electrode 2.

In the FIG. 1, the electrode 2 is shown in its measuring position. Here, electrode 2 is situated in the part of the U-shaped guide-tube 8 that is outside the reactor pressurized reactor tank 10, and acts as an emitter. A tubular part, designated as measuring tube 4, is made of an insulating material. Tube 4 carries at its outside a number of metal sleeves constituting sections 5 (collectors) of the associated second electrode. The number of sections 5 depends on the length of the electrode 2 and on the width of the metal sleeves. For example, six, ten, or more sections 5 may be used. The metal sleeves may be made in the form of a metal layer evaporated on a ceramic tube. Another possibility of carrying out the invention consists of a series of metal tubular pieces which are, through oxidizing for example, provided with an inner insulating layer, and are aligned axially on an insulating-material carrier.

Each of the sections 5 has associated with it a measuring device 7 for measuring the current based on beta-radiation. Measuring device 7 may, for example, include a DC current amplifier, with an indicating device connected at its output. The number of measuring devices 7 thus corresponds to the number of sections 5, and the one common connection of the measuring devices 7 comprises and leads to an emitter contact 6, which produces a conductive connection to the metal electrode 2. With this construction, the electrode 2 may comprise a coil spring made of vanadium and provided at its ends with rounded-off caps. Electrode 2 can, with the aid of compressed-air connectors, indicated by numeral 9, which are provided at both ends of the guide-tube, be made to move by pneumatic means. For the purpose of activating the electrode 2, the connection 9 of the measuring tube 4 is impinged. In this manner, the flexible electrode 2 is run into the activating position at point 3 in the core 1, where it throughout its length becomes activated differently by the neutrons in accordance with the local flow density. After the period of activation, the electrode 2, by means of compressed air supplied to the end 9 of the guide-tube 8 situated in the reactor, is forced back into the measuring tube 4. In that position, it is possible for the measuring devices 7 to measure the currents produced by beta radiation, thereby determining the neutron flow density distribution. The resolution depends on the fineness of division of the electrode sections 5.

According to the embodiment of FIG. 1, the measurement is ordinarily made simultaneously, with one of the number of measuring devices 7 corresponding to one of the number of sections 5. It is, however, also possible to use switchable measuring devices, provided that the chronological sequence of measurements does not impair the results of the measurements.

Figures 2, 3:
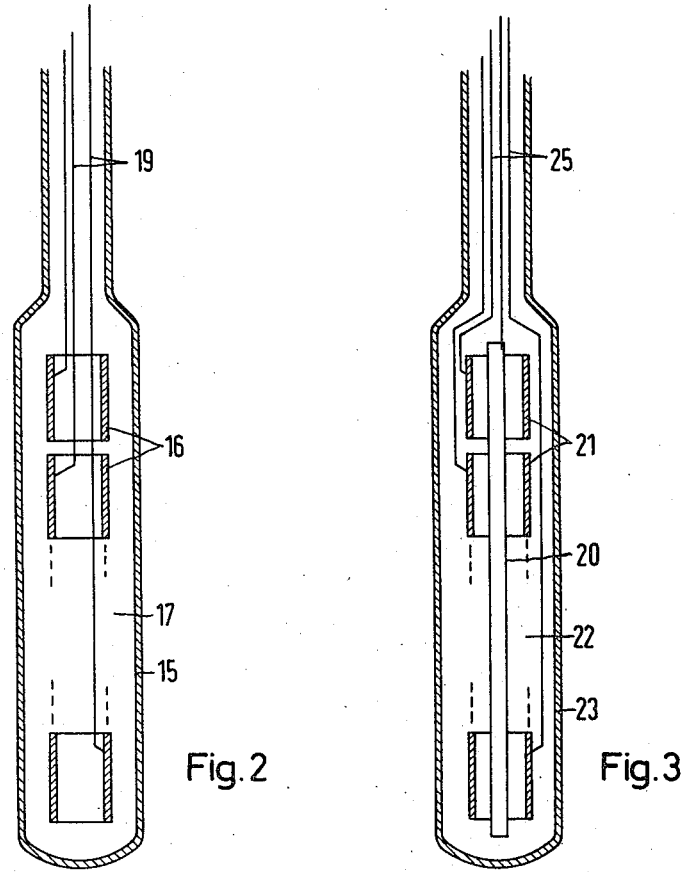
FIG. 2 shows another embodiment of the invention wherein the electrode assembly is designed for fixed installation in the reactor tank.
FIG. 3 shows still another embodiment of the invention wherein the electrode assembly is designed for installation in the reactor tank.

The apparatus shown in FIG. 2 is designed for fixed installation in the reactor core 1, which is not illustrated further. With this arrangement, the elongated electrode is a metal tube 15, which serves as a collector. There are associated with the collector electrode 15 a number of metal rings, shown as sections 16 of the electrode serving as an emitter. Emitter electrode sections 16 are surrounded by the collector electrode 15. In this way, it is possible to determine the neutron flow density distribution over the length of the electrode sections 16.

The collector electrode 15 and the emitter electrode sections 16 are separated from one another by insulating material 17 and are disposed in the interior of the reactor core 1. Also, the electrodes 15 and 16 are connected, by means of a multistrand ceramically-insulated cable 19, with a measuring device, not shown, located outside the reactor core 1 and the reactor pressurized tank 10 surrounding it. This cable 19 can, at the same time, serve as a mechanical holder for the emitter and collector, whereby on occasion there is provided a guide-tube, which makes possible occasional removal of the parts of the apparatus situated in the core, for maintenance purposes or the like.

The apparatus shown in FIG. 3 is similar to the embodiment shown in FIG. 2 in that it is fastened in the interior of the reactor core 1. In this case, the elongated electrode acting as an emitter is a metal rode 20, which is surrounded by the sections 21 of the second electrode serving as a collector. The electrodes 20 and 21 are insulated from one another by an insulating material 22, they are housed, together with this insulation 22, in a protector tube 23, and thereafter fastened within the reactor core 1. There can again be seen the strands 25 of an electric cable, which leads to measuring devices, such as devices 7 shown in FIG. 1, disposed outside the core 1 and reactor pressurized tank 10.

The measuring arrangement of embodiment shown in FIG. 3 has the advantage of making it possible, at small expense, to determine the neutron flow density distribution over a certain area. A further advantage is the possibility of employing the protector tube 23 also as an electrode, in order to obtain compensation of the gamma radiation, which under certain conditions affects the measurement.

Although the above description is directed to the preferred embodiments of the invention, it is noted that other variations and modifications will be apparent to those skilled in the art, and, therefore, may be made without departing from the spirit and scope of the present invention.

What is claimed is:

1. An apparatus for determining the neutron flow density in a nuclear reactor core and having emitter and collector electrodes insulated from each other and between which measurable current is produced by beta radiation; wherein the improvement comprises one of said electrodes being elongated to extend over a large area of said core and the other of said electrodes being in the form of a plurality of mutually separated sections interspaced along the length of said elongated electrode and cable conductors each individually connected to an individual one of said separated sections.

2. The apparatus of claim 1 in which said elongated electrode is an elongated metal tube and said separated sections are in the form of metal rings positioned inside of said tube and interspaced longitudinally therewithin.

3. The apparatus of claim 1 in which said elongated electrode is in the form of a metal rod and said separated sections are in the form of metal rings encircling said rod at interspaced positions therealong, and an elongated metal tube encloses said rings and said rod.

* * * * *